United States Patent
Lambert et al.

(10) Patent No.: US 9,384,525 B2
(45) Date of Patent: Jul. 5, 2016

(54) SYSTEMS AND METHODS FOR PROVIDING PRE-OPERATING SYSTEM AND POST-OPERATING SYSTEM REMOTE MANAGEMENT OF INFORMATION HANDLING SYSTEM

(71) Applicant: Dell Products L.P., Round Rock, TX (US)

(72) Inventors: Timothy M. Lambert, Austin, TX (US); Elie Antoun Jreij, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 259 days.

(21) Appl. No.: 14/048,520

(22) Filed: Oct. 8, 2013

(65) Prior Publication Data

US 2015/0097843 A1   Apr. 9, 2015

(51) Int. Cl.
*G06T 1/20* (2006.01)
*G06F 9/44* (2006.01)
*G09G 5/00* (2006.01)

(52) U.S. Cl.
CPC ............... *G06T 1/20* (2013.01); *G06F 9/4401* (2013.01); *G09G 5/00* (2013.01)

(58) Field of Classification Search
CPC ....................................................... G06T 1/20
See application file for complete search history.

(56) References Cited

U.S. PATENT DOCUMENTS

| | | | | |
|---|---|---|---|---|
| 2008/0282117 A1* | 11/2008 | Partani | .................... | G06F 3/023 714/48 |
| 2012/0154375 A1* | 6/2012 | Zhang | .................... | G06F 9/4411 345/419 |
| 2014/0281894 A1* | 9/2014 | Maity | .................... | G06F 3/033 715/234 |

* cited by examiner

*Primary Examiner* — Ryan D McCulley
(74) *Attorney, Agent, or Firm* — Jackson Walker L.L.P.

(57) ABSTRACT

A method may include during a pre-operating system environment writing user graphics data to a discrete graphics controller and an embedded graphics controller of a service processor integral to the information handling system and storing user graphics data written to the embedded graphics controller in a frame buffer such that a remote management information handling system remotely coupled to the information handling system via the service processor may receive user graphics data from the frame buffer. The method may also include during a post-operating system environment establishing a remote management connection between the service processor and a host processor of the information handling system via an internal network, communicating datagrams from the host processor to the embedded processor, wherein the datagrams comprise a payload including post-operating system user graphics data, and communicating the post-operating system user graphics data from the service processor to the remote management information handling system.

12 Claims, 2 Drawing Sheets

SYSTEMS AND METHODS FOR PROVIDING PRE-OPERATING SYSTEM AND POST-OPERATING SYSTEM REMOTE MANAGEMENT OF INFORMATION HANDLING SYSTEM

TECHNICAL FIELD

The present disclosure relates in general to information handling systems, and more particularly to providing for remote management and console redirection of remotely managed information handling systems having embedded and discrete graphics controllers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may comprise a service processor configured to permit an administrator or other person to remotely monitor and/or remotely manage such information handling system via a management console remotely connected to the information handling system via a network. Oftentimes, a service processor may comprise various items of embedded hardware, including an embedded graphics controller that facilitates display of information from the information handling system to the remote console, and in some instances mirroring to the management console the graphics output displayed to a monitor local to the information handling system, known as remote console redirection. However, many traditional approaches do not typically support an ability of the service processor to provide remote console redirection with a discrete graphics controller of its associated information handling system but external to the service processor. Existing solutions to provide such support are not without significant disadvantages. For example, one solution is to provide discrete cabling of the discrete graphics processor back into a video connection of the service processor, but such solution adds additional cost, space, and cabling limitations, and such solution cannot be supported in many modular server solutions wherein multiple modular information handling systems reside in a single chassis.

SUMMARY

In accordance with the teachings of the present disclosure, the disadvantages and problems associated with remote management of information handling systems have been reduced or eliminated.

In accordance with embodiments of the present disclosure, an information handling system may include a host processor, a discrete graphics controller coupled to the host processor, a service processor coupled to the host processor, a memory coupled to the service processor, and a basic input/output system. The discrete graphics controller may be configured to process user graphics data for display to a display device coupled to the discrete graphics controller. The service processor may be configured to facilitate remote management of the information handling system, and may include an embedded processor and an embedded graphics controller coupled to the host processor and configured to process management graphics data for display to a display device coupled to a remote management information handling system. The memory may include a frame buffer for storing management graphics data. The basic input/output system may include a program of instructions embodied in non-transitory computer-readable media, the instructions for, when read and executed by the host processor, causing the host processor to write user graphics data to the discrete graphics controller and the embedded graphics controller during a pre-operating system environment of the information handling system. During the pre-operating system environment, the embedded graphics controller may configured to store user graphics data written to it in the frame buffer such that the remote management information handling system may receive user graphics data from the frame buffer. In a post-operating system environment of the information handling system, the embedded processor is configured to establish a remote management connection to the host processor via an internal network whereby the host processor communicates datagrams to the embedded processor and wherein the datagrams comprise a payload including post-operating system user graphics data, and the service processor communicates the post-operating system user graphics data to the remote management information handling system.

In accordance with these and other embodiments of the present disclosure, a method may include during a pre-operating system environment of an information handling system writing user graphics data to a discrete graphics controller integral to the information handling system and an embedded graphics controller of a service processor integral to the information handling system and storing user graphics data written to the embedded graphics controller in a frame buffer integral to the information handling system such that a remote management information handling system remotely coupled to the information handling system via the service processor may receive user graphics data from the frame buffer. The method may also include during a post-operating system environment of the information handling system establishing a remote management connection between the service processor and a host processor of the information handling system via an internal network, communicating datagrams from the host processor to the embedded processor, wherein the datagrams comprise a payload including post-operating system user graphics data, and communicating the post-operating system user graphics data from the service processor to the remote management information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
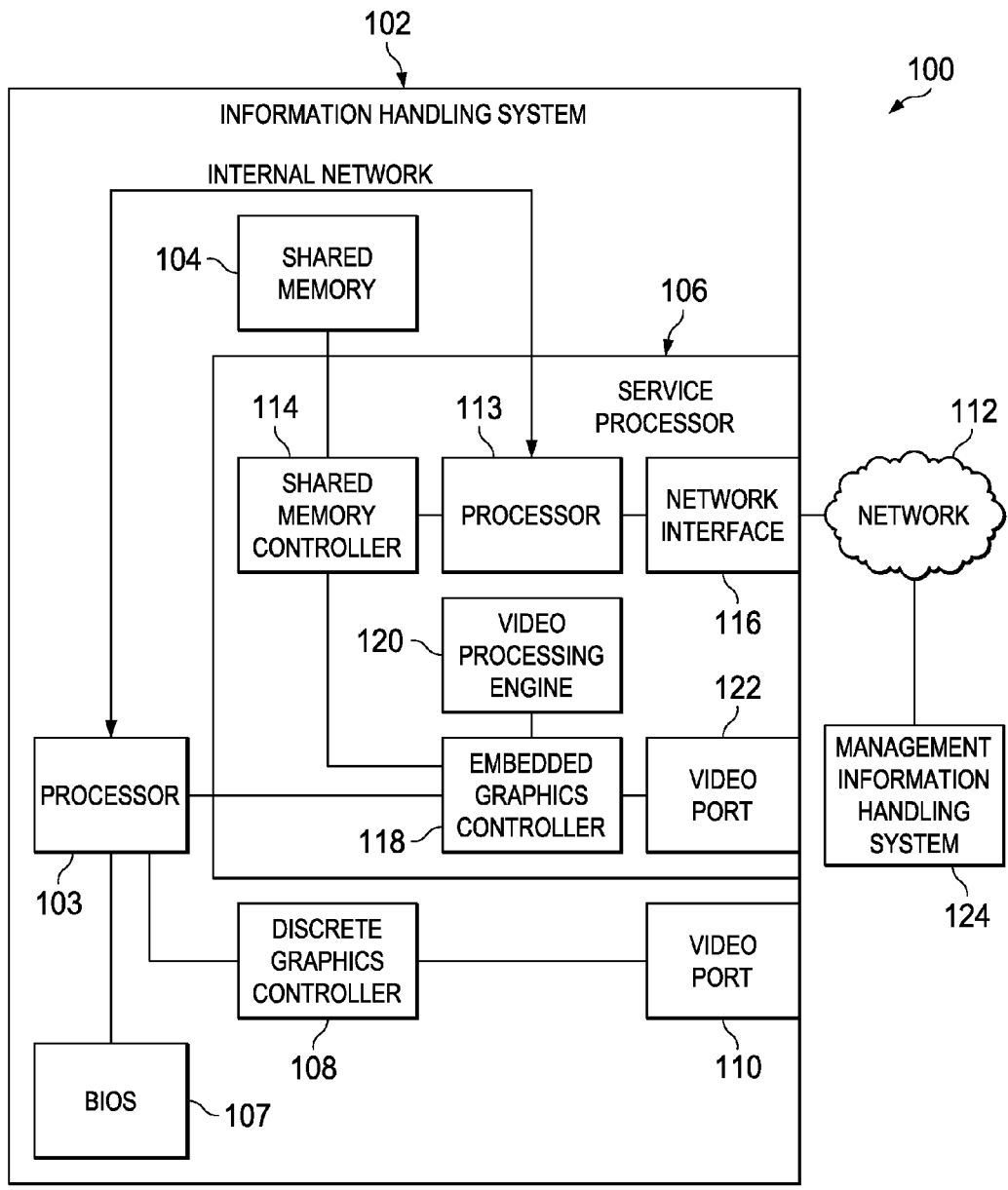
FIG. 1 illustrates a block diagram of an example system providing for remote management of an information handling system, in accordance with embodiments of the present disclosure.
Figure 2:
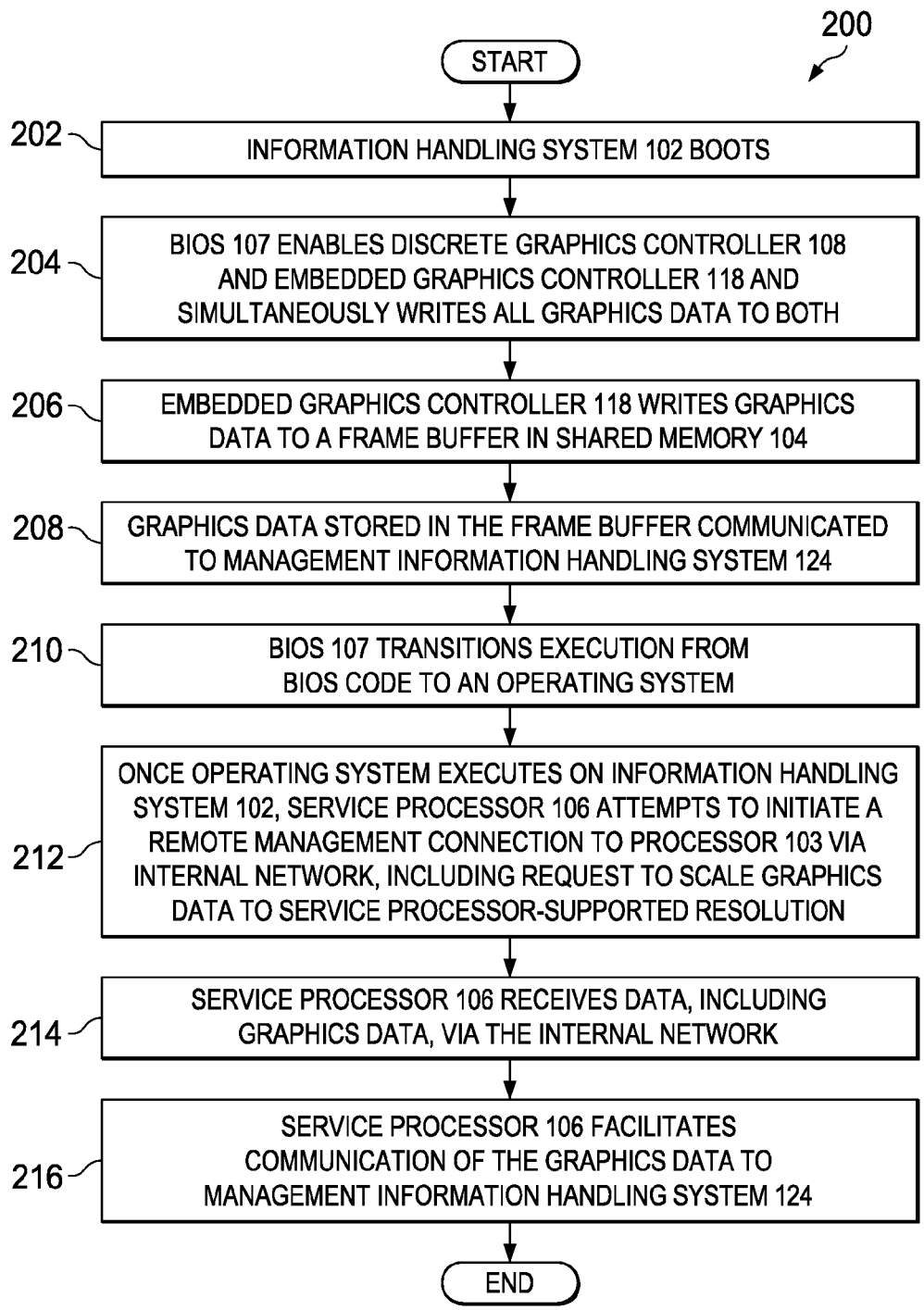
FIG. 2 illustrates a flow chart of an example method for providing remote console redirection, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 is a block diagram of an example system 100 providing for remote management of an information handling system 102, in accordance with embodiments of the present disclosure. As shown in FIG. 1, system 100 may comprise an information handling system 102, a network 112, and a management information handling system 124.

In some embodiments, information handling system 102 may be a server. In other embodiments, information handling system 102 may be a personal computer (e.g., a desktop computer or a portable computer). As depicted in FIG. 1, information handling system 102 may include a host processor 103, a shared memory 104, a service processor 106 communicatively coupled to host processor 103 and shared memory 104, a basic input/output system (BIOS) 107, a discrete graphics controller 108, and a video port 110.

Host processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, host processor 103 may interpret and/or execute program instructions and/or process data stored in a computer-readable medium of information handling system 102.

Shared memory 104 may be communicatively coupled to service processor 106 and may include any system, device, or apparatus configured to retain program instructions and/or data for a period of time (e.g., computer-readable media). Shared memory 104 may include RAM, EEPROM, a PCM-CIA card, flash memory, magnetic storage, opto-magnetic storage, or any suitable selection and/or array of volatile or non-volatile memory that retains data after power to information handling system 102 is turned off.

Service processor 106 may be coupled to host processor 103 and shared memory 104 and may comprise a microcontroller which may be embedded on a motherboard of information handling system 102. Service processor 106 may manage an interface between system management software executing on management information handling system 124 (e.g., which may interface with service processor 106 via network 112) and information handling resources of information handling system 102. For example, different types of sensors built into information handling system 102 may report to service processor 106 on parameters such as temperature, cooling fan speeds, power status, operating system status, etc. Service processor 106 may monitor the sensors and may send alerts to a system administrator via the management network if any of the parameters do not stay within preset limits, indicating a potential failure of information handling system 102. The administrator may also remotely communicate with service processor 106 to take some corrective action such as resetting or power cycling information handling system 102 in order cause a stalled operating system to execute again. In addition, service processor 106 may be configured to facilitate remote console redirection between information handling system 102 and management information handling system 124, such that graphical data displayed to a monitor or other display device locally coupled to information handling system 102 may also display to a monitor or other display device locally coupled to management information handling system 124 (e.g., as part of a virtual keyboard-video-mouse plugin of remote management software executing on management information handling system 124).

As shown in FIG. 1, service processor 106 may include an embedded processor 113, shared memory controller 114, network interface 116, embedded graphics controller 118, video processing engine 120, and video port 122.

Embedded processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, host processor 103 may interpret and/or execute program instructions and/or process data stored in a computer-readable medium of information handling system 102. In some embodiments, embedded processor 113 may be a special-purpose processor dedicated to operations associated with service processor 106, and thus may have reduced functionality as compared to a general purpose processor such as host processor 103.

As shown in FIG. 1, embedded processor 113 may be coupled to host processor 103 via an internal communications network. Such internal network may serve as a "pass-through" between an operating system executing on host processor 103 and embedded processor 113 such that host processor 103 may communicate directly with embedded processor 113. In some embodiments, service processor 106 may emulate a Universal Serial Bus (USB) network interface in order to communicate with host processor 103. In other embodiments, service processor 106 and host processor may communicate via network interface 116 and another network interface (not explicitly shown in FIG. 1) of information handling system 102 external to service processor 106. In yet other embodiments, each of information handling system 102 and service processor 106 may include network interfaces (e.g., network interface cards or virtual network interface cards, neither of which is explicitly shown in FIG. 1) capable of sending data between host processor 103 and embedded processor 113 in accordance with a suitable networking protocol (e.g., Ethernet, TCP/IP, etc.).

Shared memory controller 114 may be coupled to embedded processor 113, embedded graphics controller 118, and shared memory 104 and may be any system, device, or apparatus configured to control the flow of data between shared memory 104 and each of embedded processor 113 and embedded graphics controller 118 which may share the memory resources of shared memory 104.

Network interface 116 may include any suitable system, apparatus, or device operable to serve as an interface between service processor 106 and an external management network (e.g., a local area network or other network). Network interface 116 may enable service processor 106 to communicate with the external network using any suitable transmission protocol (e.g., TCP/IP) and/or standard (e.g., IEEE 802.11, Wi-Fi). In certain embodiments, network interface 116 may include a network interface card (NIC). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network (LAN) on motherboard (LOM) interface. In certain embodiments, network interface 116 may allow for "out-of-band" control of an information handling system 102, such that communications to and from service processor 106 are communicated via a management channel or network physically isolated from an "in band" communication channel for non-management traffic associated with information handling system 102. In some embodiments, network interface 116 may also serve as a communication path between service processor 106 and processor 103.

Embedded graphics controller 118 may be a specialized electronic circuit or system designed to process data from host processor 103 and/or shared memory 104 to accelerate the building of images in a frame buffer (which may be stored in shared memory 104) intended for output to a display (e.g., to a remote console at management information handling system 124). Embedded graphics controller 118 may include or be coupled to a video processing engine that executes various video processing functions, including for example video capture, calculating differences between video frames, and video data compression.

Video port 122 may include any system, device, or apparatus configured to serve as an interface between embedded graphics controller 118 and a source of video data. In some embodiments, communication between video port 122 and embedded graphics controller 118 may be via a standard graphics standard (e.g., Video Graphics Array (VGA)).

BIOS 107 may be communicatively coupled to host processor 103 and may comprise any system, device, or apparatus configured to store instructions to be executed by host processor 103 when information handling system 102 is booted and/or powered on. In some embodiments, BIOS 107 may be boot firmware and may be configured to be the first code executed by host processor 103 when information handling system 102 is booted and/or powered on. The initial function of BIOS 107 may be to identify, test, and initialize components of information handling system 102 (e.g., graphics controllers, storage resources, and other hardware). As part of such initialization, BIOS code may be configured to set components of information handling system 102 into a known state, so that software (e.g., an operating system) stored on compatible computer-readable media can be loaded into memory accessible to host processor 103, executed by host processor 103, and given control of information handling system 102. In some embodiments, BIOS 107 may comprise a Unified Extensible Firmware Interface (UEFI).

Discrete graphics controller 108 may be a specialized electronic circuit or system designed to process data from host processor 103 and/or a memory accessible to discrete graphics controller 108 to accelerate the building of images in a frame buffer intended for output to a display coupled to video port 110. Video port 110 may include any system, device, or apparatus configured to serve as an interface between discrete graphics controller 108 and a monitor or display device coupled to video port 110. In some embodiments, communication between video port 110 and discrete graphics controller 108 may be via a standard graphics standard (e.g., Video Graphics Array (VGA)).

Network 112 may be a network and/or fabric configured to couple management information handling system 124 and information handling system 102 to each other and/or one or more other information handling systems. In these and other embodiments, network 112 may include a communication infrastructure, which provides physical connections, and a management layer, which organizes the physical connections and information handling systems communicatively coupled to network 112. Network 112 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 112 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 112 and its various components may be implemented using hardware, software, or any combination thereof.

In some embodiments, management information handling system 124 may be a server. In other embodiments, management information handling system 124 may be a personal computer (e.g., a desktop computer or a portable computer). Although not expressly depicted in FIG. 1, management information handling system 124 may include a one or more processors, one or memories, and/or one of more other information handling resources. Management information handling system 124 may communicate to information handling system 102 via any suitable management protocol or standard, including without limitation Intelligent Platform Management Interface (IPMI) and Simple Network Management Protocol (SNMP).

In operation, various components of system 100 may operate in concert to facilitate remote console redirection of a display of information handling system 102 to management information handling system 124 while supporting the presence of discrete graphics controller 108, as described in greater detail below with respect to FIG. 2.

FIG. 2 illustrates a flow chart of an example method 200 for providing remote console redirection, in accordance with embodiments of the present disclosure. According to one embodiment, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, information handling system 102 may boot. At step 204, BIOS 107 may execute and enable both discrete graphics controller 108 and embedded graphics controller 118 prior to an operating system loading (e.g., in a pre-operating system environment) and executing on host processor 103, such that host processor 103 simultaneously writes all graphics data to discrete graphics controller 108 and embedded graphics controller 118. Because graphics data is written to discrete graphics controller 108, a user local to information handling system 102 may see graphics data displayed on a display device coupled to video port 110.

At step 206, embedded graphics controller 118 may write graphics data to a frame buffer in shared memory 104. Accordingly, at step 208, such graphics data stored in the frame buffer may be communicated to management information handling system 124 via embedded processor 113 and network 112. In addition, input/output (I/O) from management information handling system 124 may be communicated to host processor 103 via the internal network established between embedded processor 113 and host processor 103.

At step 210, BIOS 107 may transition execution from BIOS code to an operating system. During such time, BIOS 107 may disable embedded graphics controller 118 (and embedded graphics controller 118 may remain disabled from the perspective of host 102 during execution of the operating system), leaving discrete graphics controller 108 enabled. A remote console at management information handling system 124 may go blank during such transition.

At step 212, once an operating system is executing on information handling system 102, service processor 106 may, in response to detection of a remote console redirection session becoming active on service processor 106 and determination that embedded graphics controller 118 is disabled (meaning that discrete graphics controller 108 is active), attempt to initiate a remote management connection (e.g., Remote Desktop Protocol (RDP) or Virtual Network Computing (VNC) connection) to host processor 103 via the internal network between host processor 103 and embedded processor 113 described above. During this process, service processor 106 may also request that graphics data communicated from processor 103 be scaled to a service processor-supported resolution.

At step 216, service processor 106 may receive data in the form of datagrams (e.g., network frames or packets), including a payload with graphics data, via the internal network from the operating system executing on host processor 103 (e.g., in a post-operating system environment). At step 218, service processor 106 may facilitate communication of the graphics data to management information handling system 124. Communication of graphics data to management information handling system 124 may take place in one of at least two ways. In some embodiments, service processor 106 may receive data via the internal network and write graphics data extracted from such data into a frame buffer of shared memory 104. In such embodiments, such graphics data stored in the frame buffer may be communicated to management information handling system 124 via embedded processor 113 and network 112. In other embodiments, service processor 106 may receive data via the internal network and redirect/pass-through the data to management information handling system 124, where such data may be decoded to extract the graphics data therefrom for display to a remote management console at management information handling system 124. After completion of step 218, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:
1. An information handling system comprising:
a host processor;
a discrete graphics controller coupled to the host processor and configured to process user graphics data for display to a display device coupled to the discrete graphics controller;

a service processor coupled to the host processor for facilitating remote management of the information handling system, the service processor comprising:
an embedded processor; and
an embedded graphics controller coupled to the host processor and configured to process management graphics data for display to a display device coupled to a remote management information handling system;
a memory coupled to the service processor and comprising a frame buffer for storing management graphics data; and
a basic input/output system comprising a program of instructions embodied in non-transitory computer-readable media, the instructions for, when read and executed by the host processor, causing the host processor to write user graphics data to the discrete graphics controller and the embedded graphics controller during a pre-operating system environment of the information handling system;
wherein:
during the pre-operating system environment, the embedded graphics controller is configured to store user graphics data written to it in the frame buffer such that the remote management information handling system may receive user graphics data from the frame buffer;
in a post-operating system environment of the information handling system, the embedded processor is configured to establish a remote management connection to the host processor via an internal network whereby the host processor communicates datagrams to the embedded processor and wherein the datagrams comprise a payload including post-operating system user graphics data, and the service processor communicates the post-operating system user graphics data to the remote management information handling system; and
the service processor and the host processor each comprise a respective network interface for communicating via the internal network using a network communications protocol.

2. The information handling system of claim 1, the basic input/output system further causing the host processor to disable the embedded graphics controller in the post-operating system environment.

3. The information handling system of claim 1, wherein the embedded processor is configured to receive the datagrams, extract the post-operating system user graphics data from the datagrams, and store the post-operating system user graphics data in the frame buffer, such that the remote management information handling system may receive post-operating system user graphics data from the frame buffer.

4. The information handling system of claim 1, wherein the embedded processor is configured to receive the datagrams and communicate the datagrams to the remote management information handling system.

5. The information handling system of claim 4, wherein the embedded processor is configured to communicate the datagrams to the remote management information handling system in a manner such that the remote management information handling system extracts the user graphics data from the datagrams.

6. The information handling system of claim 1, wherein the service processor emulates a Universal Serial Bus network interface in order to communicate with the host processor via the internal network.

7. A method comprising:
during a pre-operating system environment of an information handling system:
writing, by a host processor of the information handling system, user graphics data to a discrete graphics controller integral to the information handling system and an embedded graphics controller of a service processor integral to the information handling system, wherein the discrete graphics controller is configured to process user graphics data for display to a display device coupled to the discrete graphics controller and the embedded graphics controller is configured to process management graphics data for display to a display device coupled to a remote management information handling system; and
storing user graphics data written to the embedded graphics controller in a frame buffer integral to the information handling system such that a remote management information handling system remotely coupled to the information handling system via the service processor may receive user graphics data from the frame buffer; and
during a post-operating system environment of the information handling system:
establishing a remote management connection between an embedded processor of the service processor and the host processor of the information handling system via an internal network, wherein the service processor and the host processor each comprise a respective network interface for communicating via the internal network using a network communications protocol;
communicating datagrams from the host processor to the embedded processor, wherein the datagrams comprise a payload including post-operating system user graphics data; and
communicating the post-operating system user graphics data from the service processor to the remote management information handling system.

8. The method of claim 7, further comprising disabling the embedded graphics controller in the post-operating system environment.

9. The method of claim 8, further comprising:
extracting, by the embedded processor, the post-operating system user graphics data from the datagrams; and
storing the post-operating system user graphics data in the frame buffer, such that the remote management information handling system may receive post-operating system user graphics data from the frame buffer.

10. The method of claim 8, further comprising communicating, by the service processor, the datagrams to the remote management information handling system.

11. The method of claim 10, wherein communicating the datagrams to the remote management information handling system comprises communicating the datagrams in a manner such that the remote management information handling system extracts the user graphics data from the datagrams.

12. The method of claim 7, wherein the service processor emulates a Universal Serial Bus network interface in order to communicate with the host processor via the internal network.

* * * * *